Sept. 13, 1966
H. H. ADISE
3,272,001
TONOMETER
Filed Dec. 16, 1963
3 Sheets-Sheet 1
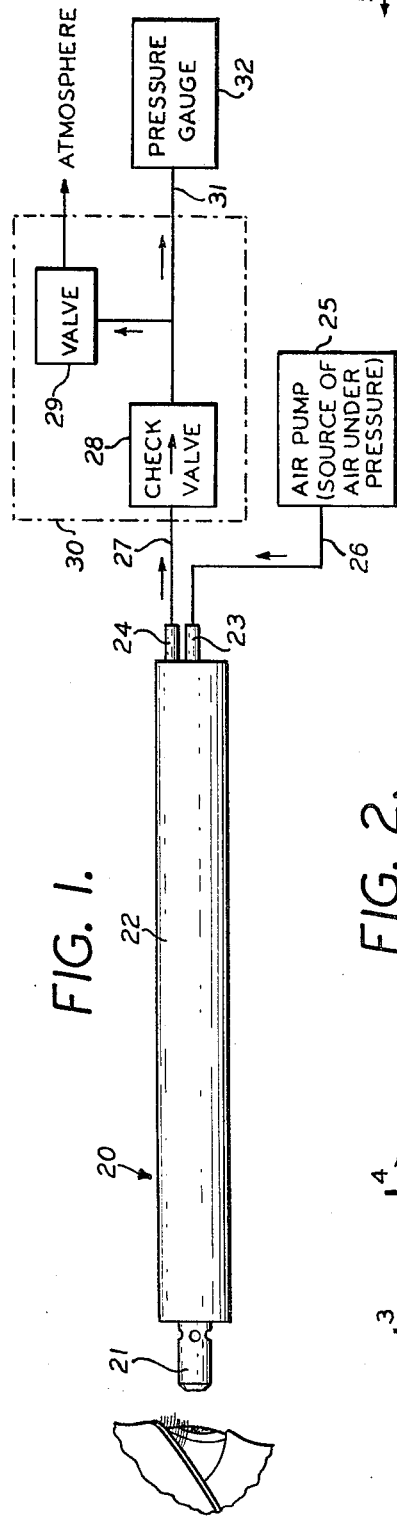
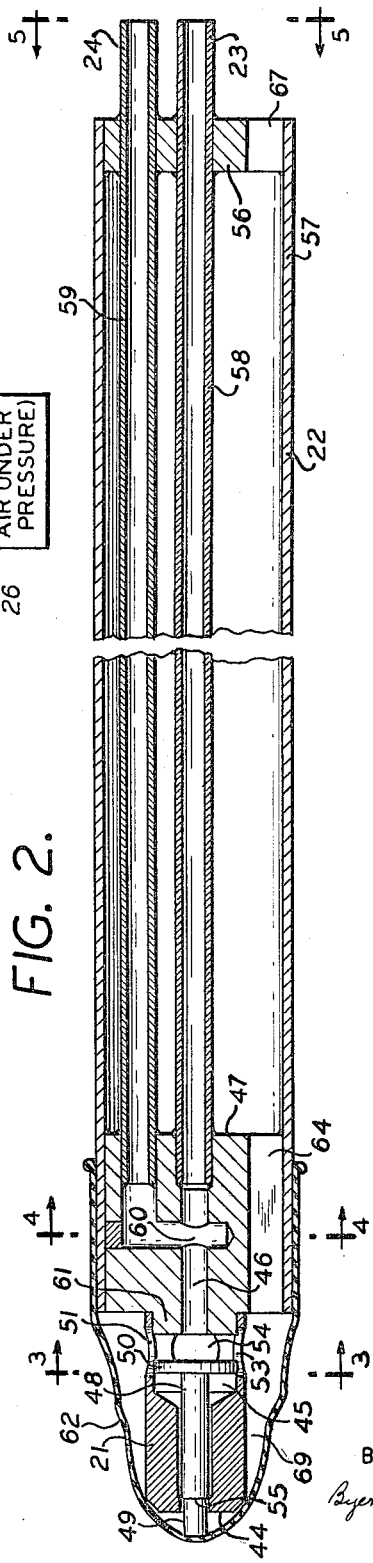
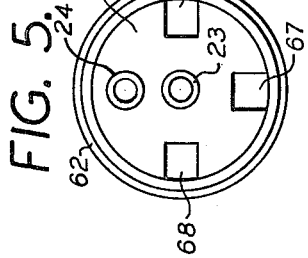
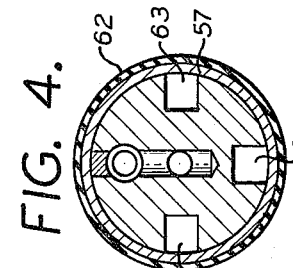
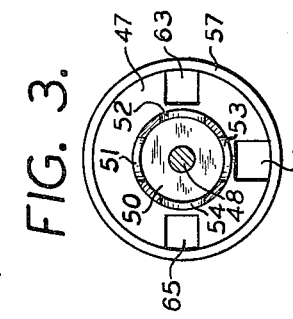
INVENTOR
HERBERT H. ADISE
BY
Byerly, Townsend, Watson & Churchill
ATTORNEYS.

Sept. 13, 1966  H. H. ADISE  3,272,001
TONOMETER

Filed Dec. 16, 1963  3 Sheets-Sheet 2

INVENTOR
HERBERT H. ADISE
BY
Byerly, Townsend, Watson & Churchill
ATTORNEYS.

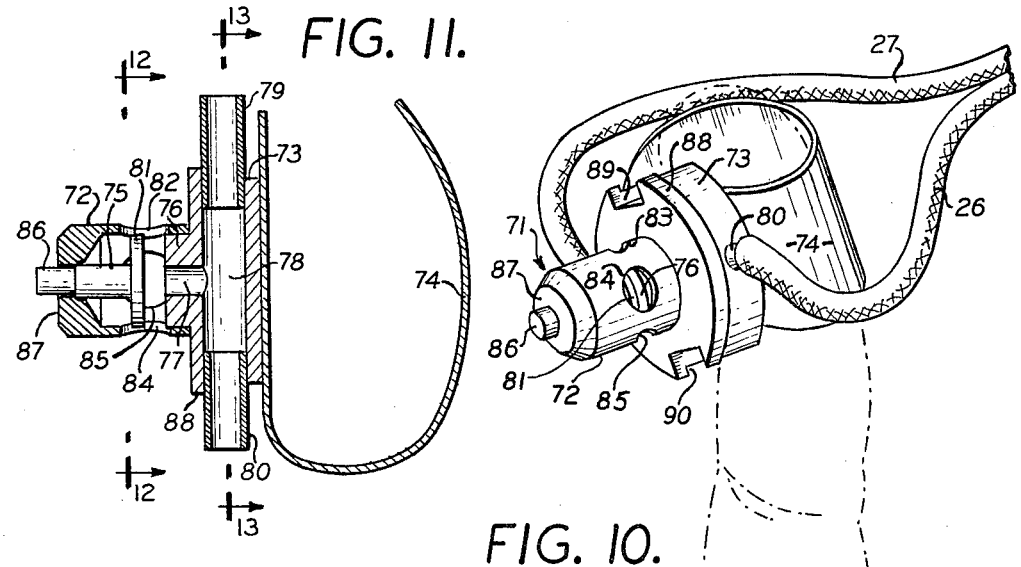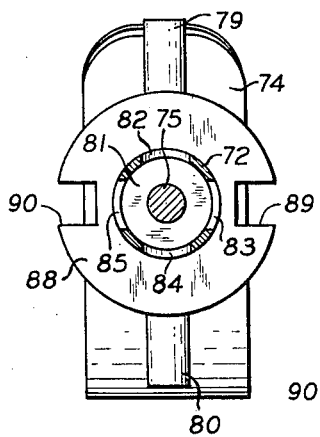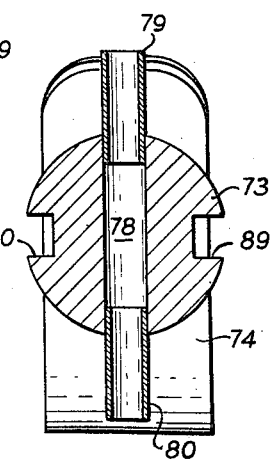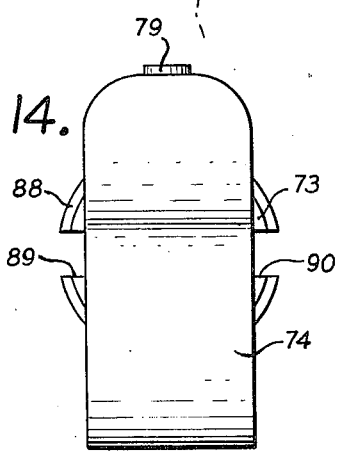

United States Patent Office 3,272,001
Patented Sept. 13, 1966

3,272,001
TONOMETER
Herbert H. Adise, Great Neck, N.Y., assignor to Computer Instruments Corporation, Long Island, N.Y., a corporation of New York
Filed Dec. 16, 1963, Ser. No. 330,716
7 Claims. (Cl. 73—80)

The present invention relates to a tonometer, i.e., a device for measuring the intraocular pressure of an eyeball.

It is now well known that certain maladies or defects of the human eye, such as glaucoma, can be detected in the incipient stages by accurate periodic measurements of the intraocular pressure. In glaucoma an increase in internal pressure of the eyeball, if not relieved, will in time cause blindness through damage to the optic nerve. A typical eyeball pressure in a human being is of the order of 25 mm. Hg or about 0.5 p.s.i. (It is to be understood that the pressures referred to herein are gauge pressures and not absolute pressures.) Obviously, it is important to detect rising eyeball pressure at an early opportunity; and it will be appreciated that the instrument to measure it must be extremely sensitive.

Many devices have been proposed for measuring this pressure, but at present only two general types have seen any appreciable use. In one type a plunger is placed upon the front surface of the eyeball in a vertical position and the indentation due to loading with a known weight is measured; in the other type the area flattened by pressing a transparent plate against the eyeball with a given force is measured optically. Both of these types require considerable experience on the part of the operator for consistent readings and necessitate, because of the time needed to perform a measurement, anesthetizing the eyeball.

Some attempts have been made to provide tonometers capable of making measurements with sufficient speed that the use of an anesthetic can be avoided. Electrically powered devices of one form or another have been described in the literature, but these do not appear to have met with any degree of acceptance or success. For the most part electrical devices, in the absence of costly and refined means for stabilization are subject to drift errors, component failure and the like.

With the foregoing in mind, it is an object of the present invention to provide a relatively simple and inexpensive device having the requisite sensitivity for determining without anesthesia and to a high degree of accuracy the internal or intraocular pressure of an eyeball.

In accordance with the present invention the foregoing objective is attained by providing a device comprising a probe having a wall for engaging the surface of the eyeball, an axially movable plunger carried within the probe with an end extending through an aperture in the wall, means for extending the plunger from the wall when the probe is out of contact with the eyeball, the means permitting the plunger to retract when the wall of the probe is urged into contact with the eyeball, means actuated upon retraction of the plunger for urging the plunger toward its extended position with continually increasing force until the resistance due to the intraocular pressure is overcome, and means for indicating the magnitude of the force which is required to overcome the resistance.

More specifically, the invention involves a sensitive force balance where air pressure from a low pressure source having a relatively low supply rate is balanced against the eyeball pressure. By reason of the low supply rate, as will appear hereinafter, a very sharp balance or indication is obtained. The accuracy of the gauge is dependent substantially entirely upon the accuracy of the particular pressure gauge employed as the indicating means.

Any arrangement which requires an operator to apply a probe to an eyeball with sufficient force to flatten a small area without damage, of necessity, requires a certain degree of skill and experience. One embodiment of the present invention in the form of a pencil-like probe has demonstrated in actual field tests its ability to provide rapid and accurate measurements without causing patient discomfort. While the pencil-like probe did not prove to require an undue amount of care on the part of the operator it was found that the degree of skill required could be lessened still further by embodying the invention in a finger held (as opposed to hand held) configuration where use could be made of one's natural or inherent digital control and sensitivity.

The present invention will be better understood after reading the following detailed description of the presently preferred embodiments thereof with reference to the appended drawings in which:

FIGURE 1 is a schematic diagram of the essential components making up a system embodying the invention and incorporating the pencil-like probe;

FIGURE 2 is a longitudinal sectional view on an enlarged scale of the probe seen in FIGURE 1 and showing the plunger in fully extended position;

FIGURE 3 is a transverse sectional view taken along line 3—3 in FIGURE 2 with the protective cot removed for clarity;

FIGURE 4 is a transverse sectional view taken along line 4—4 of FIGURE 2;

FIGURE 5 is an end view of the probe as viewed from the line 5—5 in FIGURE 1;

FIGURE 10 is an enlarged perspective view showing the finger held embodiment of the present invention in operative position preparatory to taking a measurement;

FIGURE 11 is a horizontal longitudinal sectional view of the embodiment shown in FIGURE 10;

FIGURE 12 is a transverse sectional view taken along line 12—12 in FIGURE 11;

FIGURE 13 is a transverse sectional view taken along line 13—13 in FIGURE 11, and FIGURE 14 is a rear view of the embodiment shown in FIGURE 11.

Throughout the drawings the same reference numerals are employed to designate identical parts.

Figure 6:
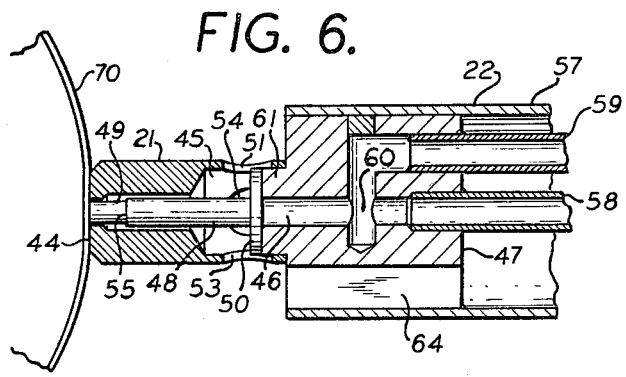
FIGURE 6 is a fragmentary sectional view of the nose of the probe of FIGURE 1 showing the position of the plunger when the probe is first pressed against the eyeball, the protective cot being removed for convenience.

Reference should now be had to FIGURE 1 wherein a pencil-like probe constructed in accordance with the present invention is shown generally at 20. The probe has a nose piece 21 carried at the forward end of a handle 22. The opposite end of the handle is provided with two hose or tube fittings 23 and 24. Further details of construction and operation of the probe will be discussed after describing the general system.

The complete system includes an air pump 25 or other source of air under pressure which is coupled by an air line or conduit 26 to the fitting 23. The fitting 24 is coupled by a conduit 27 to a check valve 28 which forms with a valve 29 a valve assembly represented by the phantom outline 30. As shown, the check valve 28 is coupled through the valve 29 to the atmosphere and through a conduit 31 to a pressure gauge 32.

Figure 9:
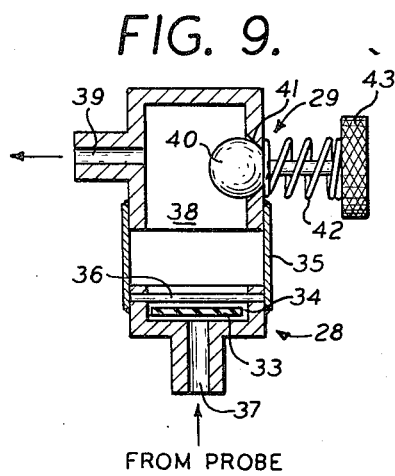
FIGURE 9 is a sectional view of the check valve and relief valve mechanism forming a part of the system of FIGURE 1.

Details of the valve assembly 30 are shown in FIGURE 9. The check valve 28 consists of a thin flexible membrane or diaphragm 33 loosely fitting in the end 34 of the housing 35 and restrained against gross displacement by a pin 36. In known manner air entering the bore or passage 37 from the probe will unseat the diaphragm 33 and pass through the cavity 38 to the outlet passage 39, and then to the pressure gauge. Reverse flow of the air is prevented by the diaphragm seating on the end of housing 35 and sealing the passage 37. Hence, the air pressure between the pressure gauge 32 and the check valve 28 will follow any pressure received from the probe up to its maximum value and will remain at such maximum value indefinitely until the valve 29 is actuated manually to unseat the ball 40 from the orifice 41. In known manner the spring 42 will keep the valve 29 closed in the absence of manual pressure on the button 43.

Details of the probe 20 are shown in FIGURES 2 to 5 to which attention is now directed. The nose piece 21 of the probe has a wall 44 for engaging the surface of the eyeball. A chamber 45 is provided within the nose piece portion of the probe and may be considered to include the portion 46 of the central passage through the end plug 47 of the handle. An axially movable plunger 48 is carried within the chamber 45 and has a slightly reduced tip 49 which extends through an aperture in the wall 44 to the exterior. The enlarged head 50 of the plunger 48 rides in the enlarged portion of the chamber 45 past the peripheral ports 51, 52, 53 and 54. Outward motion of the plunger 48 is limited by a shoulder 55 spaced from the tip which shoulder engages the interior of the wall 44. FIGURE 2 shows the plunger in its farthest extended position.

In addition to the end plug 47, the handle includes a rear plug 56, a casing 57, and two ducts or tubes 58 and 59. The parts may be made of metal and soldered or brazed together as shown. It will be observed that the fitting 23 constitutes the projecting end of the duct 58 while the fitting 24 is the end of duct 59. Both ducts communicate with passages in the plug 47 which intersect at 60.

The plug 47 is provided with a boss 61 having a valve seat formed on its face perpendicular to the axis of the probe. The enlarged head 50 of the plunger 48 is arranged, when fully retracted, to engage and seal against the boss 61 so as to close off or occlude the passage 46 and thereby isolate that passage from the ports 51 to 54. The boss 61 may be assembled, as shown to the nose piece 21 by means of an interference fit.

While it is not essential, some operators prefer to protect the eyeball from direct contact with the metal of the probe or instrument. This may be accomplished by use of the rubber cot 62 fitted over the nose piece 21 and embracing the end of the handle. Commercially available cots are sufficiently thin so as not to interfere with the operation or accuracy of the device. Furthermore, the nature of the device is such that its measurements are not affected by a membrane overlying the wall 44.

As best seen in FIGURES 3 to 5, the plugs 47 and 56 are provided with a plurality of longitudinal slots or passages 63 to 65 and 66 to 68, respectively. Thus, with the cot 62 in place the slots 63 to 68 provide free communication between the atmosphere and the space 69 between the nose piece 21 and the cot 62.

It should now be understood that the system of FIGURE 1 consists of the probe 20 (shown in detail in FIGURES 2 to 5), the valve assembly 30 (shown in detail in FIGURE 9), a pressure gauge 32, and an air supply 25. A small electric vibrator or diaphragm pump of the type generally used to aerate small home aquariums has been used successfully as the pump 25. The supply should be reasonably steady and free from pulsations. A maximum static pressure of 150 mm. Hg will be adequate.

The pressure gauge 32 may take the form of any conventional low pressure gauge capable of covering the range from 0–50 mm. Hg. An expanding diaphragm type gauge has been used with success.

The conduits 26, 27 and 31 may be provided conveniently by flexible tubing. It should be understood that tubing 27 joins fitting 24 of the probe 20 to the bore 37 in the valve assembly of FIGURE 9, while tubing 31 joins the bore 39 in FIGURE 9 to the pressure gauge 32.

In a typical embodiment, the probe handle has a length of 5″ and a diameter of 0.5″; the nose piece is 0.5″ long and 0.250″ in diameter; the ducts 58 and 59 were formed from 3/32″ metal tubing with about a 1/16″ bore; and the passage 46, end 49 of plunger 48, and aperture in wall 44 all have a diameter of about 1/16″. FIGURES 2 to 5 of the drawings are executed to scale whereby all of the remaining dimensions can be ascertained if desired.

The operation of the system of FIGURE 1 will now be described with the aid of FIGURES 2, 6 and 7. FIGURE 2 shows the condition of the probe before it is placed in contact with the eyeball. Air coming from the pump 25 passes through the duct 58 and passage 46 to impinge upon the head 50 of the plunger 48. The latter is unrestrained and will move toward its farthest extended position. This uncovers the ports 51 to 54 permitting the air to pass unimpeded into space 69 within the cot 62, then through slots 63 to 65, the casing 57, and slots 66 to 68 to the atmosphere. The ports and slots should be made large enough to prevent any significant pressure rise at the intersection 60 of duct 58 with duct 59. Bearing in mind that the pump has a low capacity or pumping rate, the foregoing condition is readily obtained. Hence, the pressure gauge will remain at zero. This is represented by the portion A of the time-pressure curve shown in FIGURE 8.

When the operator is ready to take a measurement he urges the wall 44 of the probe against the eyeball 70 until a portion of the eyeball flattens and lays flush against the probe wall 44 as shown in FIGURE 6. Since the pressure acting on the head 50 of the plunger 48 is virtually at zero gauge there is nothing to prevent retraction of the plunger as a result of contact with the eyeball. As shown, the length of the plunger is chosen such that the exposed end of the tip 49 becomes flush with the outer surface of wall 44 when the head 50 seats against the boss 61. It will be understood that the operation will be unaffected by the addition of the protective cot 62 which has been omitted from FIGURES 6 and 7 for convenience.

Figure 8:
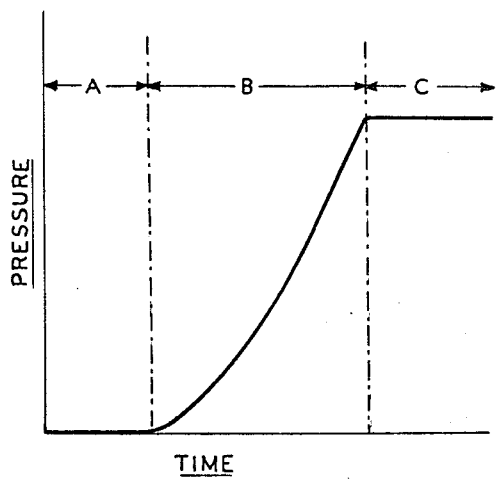
FIGURE 8 is a graph of the air pressure in the chamber of the probe during the taking of a measurement.

As soon as the plunger seals the passage 46 so as to isolate it from the ports 51 to 54 the pressure within the now closed system between the air pump and pressure gauge will rise as shown by the portion B of the curve in FIGURE 8. Pressure drops in the system are negligible in view of the low capacity air supply, and the pressure in line 31 will follow closely the pressure at intersection 60.

Figure 7:
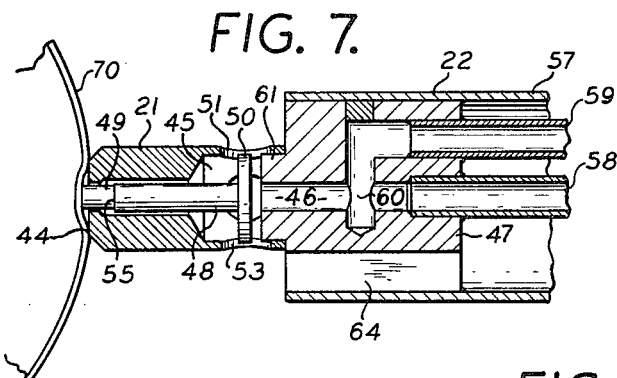
FIGURE 7 is a view similar to FIGURE 6 showing the relationship of the plunger when the chamber pressure exceeds the eyeball pressure.

As soon as the pressure within the passage 46 and therefore the force acting on plunger 48 to unseat its head 50 reaches a level sufficient to overcome the resistance due to the intraocular pressure in the eyeball 70, the plunger 48 will move slightly away from boss 61 as shown in FIGURE 7. Passage 46 is now opened to the ports 51 to 54. As will be understood the plunger will function as a throttle valve to maintain the force acting on its head 50 equal and opposite to the force acting on the end 49 due to the intraocular pressure. Again, bearing in mind that air supply 25 has a low capacity, it will not be necessary for plunger 48 to move more than a few thousandths of an inch. Hence, while the representation in FIGURE 7 has been exaggerated for clarity, the eyeball will be indented only ever so slightly. As a consequence, it has been found that the measurements are essentially independent of corneal tension and other factors which tend to introduce error in standard indentation type tonometers.

Because of the check valve 28 the pressure in the line 31 and therefore that measured by the gauge 32 will level out abruptly when the plunger 48 is unseated as shown by the portion C of the curve in FIGURE 8. The probe can now be removed from the eyeball causing it to resume the condition shown in FIGURE 2. However, the check valve retains the pressure on the gauge until the operator has completed his reading. The gauge is then reset by opening valve 29 so as to vent the line 31.

Although the probe described above can be made with a weight of only 3 or 4 ounces, it may still be enough weight to interfere with the feel of the operator with respect to proper flattening of the eyeball. With this in mind, the operating parts of the pencil-like probe have been incorporated in a tiny unit which is supported on the tip of the index finger as shown in FIGURE 10. The probe is shown generally at 71, having a nose piece 72 and a base 73. An open metal ring or clip 74 is secured to the back of the base 73 and can be adjusted to fit the individual. The probe 71 is interchangeable with the probe 20 of FIGURE 1 and, hence, is shown connected to air lines 26 and 27.

Details of the probe 71 are shown, to an enlarged scale, in FIGURES 11 to 14. In order to improve the balance or feel of the device the nose piece 72 has been foreshortened over that employed in the pencil-like embodiment. This was accompanied by shortening of the plunger 75.

The base 73 has a boss 76 provided with a central passage 77 which intersects the cross passage 78. Short lengths of metal tubing 79 and 80 are secured in opposite ends of passage 78 to provide means for connecting air lines 26 and 27. Due to the symmetry of this embodiment it is immaterial which side of passage 78 communicates with the valve assembly and pressure gauge and which with the air pump.

Plunger 75 is provided with a head 81 which seats on boss 76 to isolate passage 77 from vent ports 82, 83, 84 and 85. Plunger 75 has a reduced diameter tip 86 passing through an aperture in wall 87, outward movement of the plunger being limited by the shoulder formed by the reduced tip. The length of the plunger should be chosen so that the end of the tip 86 becomes flush with the outer surface of wall 87 when the head 81 seats on boss 76.

The base 73 has a shoulder 88 to cooperate in the retention of a protective cot (not shown). The mouth of the cot will contract behind the shoulder 88. Slots 89 and 90 are provided in base 73 to provide for atmospheric venting when a cot is in use.

From the foregoing it should be apparent that operation of the finger held probe will be identical with that of the pencil-like probe previously described. However, because of its extremely light weight and manner of holding it is easier for an operator to sense when he has applied sufficient pressure to flatten the eyeball under the wall 87.

In both embodiments described herein the diameter of the air passage through the boss which is sealed by the plunger is substantially equal to the diameter of the end of the plunger which contacts the eyeball. This relationship is not essential but it tends to make the pressure gauge 32 direct reading with only slight calibration. However, in all cases it will be found necessary, where a high degree of accuracy is desired, to calibrate individually each system in order to account for gauge non-linearities, minor pressure drops and the like.

While the embodiment shown in FIGURE 2 is not symmetrical with respect to the construction of the air passages, the connections shown in FIGURE 1 of lines 26 and 27 to fittings 23 and 24 may be interchanged without adverse affect upon the operation of the device.

The present invention has been described with reference to certain presently preferred embodiments thereof. It is to be understood that changes may be made in the details of construction as will appear to those skilled in the art without departing from the true spirit of the invention as defined in the appended claims.

What is claimed is:

1. A device for measuring the intraocular pressure of an eyeball comprising:

a probe having a wall for engaging the eyeball surface, a plunger carried within said probe with an end movable through an aperture in said wall between positions flush with and projecting from the exterior surface of said wall, means for urging said plunger into said projecting position when the probe is out of contact with said eyeball, said means permitting the plunger, when the wall of the probe is urged into contact with said eyeball, to be depressed by said eyeball until said flush position is attained, means actuated automatically upon attainment of said flush position for urging said plunger toward its projecting position with continually increasing force until the resistance due to said intraocular pressure is overcome and said plunger is caused to project from said wall in spite of engagement of said wall with said eyeball, and means for measuring at the instant the plunger leaves its flush position the force required to overcome said intraocular pressure and cause projection of said plunger and thereby indicating the magnitude of said intraocular pressure.

2. A device for measuring the intraocular pressure of an eyeball comprising a probe for application to an eyeball with a wall of the probe in contact with the eyeball surface, movable means carried by said probe for engagement with said eyeball surface when said probe is applied thereto, said movable means being movable by said eyeball relative to said probe to first position when the probe is first applied to said eyeball, means for exerting a variable force upon said movable means tending to cause movement thereof away from said first position in a direction tending to indent said eyeball surface when said probe is applied thereto, said means being arranged to exert a force below that corresponding to the intraocular pressure when said probe is out of engagement with said eyeball and including means for causing said force to increase steadily and automatically upon movement of said movable means to said first position, said force increasing until the intraocular pressure is overcome and movement is imparted to said movable means away from said first position, and means for measuring as an indication of said intraocular pressure said varable force at the onset of said movement of said movable means away from said first position after application of said probe to said eyeball.

3. A device for measuring the intraocular pressure of an eyeball comprising:

a probe having a wall for engaging the surface of said eyeball, a chamber within said probe, an axially movable plunger carried within said chamber and having one end extending through an aperture in said wall to the exterior, said plunger being movable between protrudent and retracted positions, means for introducing air under pressure into said chamber for acting against said plunger to urge said plunger into said protrudent position with said one end protruding externally from said wall when the probe is out of contact with said eyeball, means for venting said chamber when said plunger is in said protrudent position for maintaining the pressure of said air at a level inadequate to prevent depression of said plunger into said retracted position when the wall of the probe is urged into contact with said eyeball, valve means actuable upon said depression of said plunger for isolating said venting means from said means for introducing air whereby the air pressure acting upon said plunger is caused to rise continually until the resistance due to said intraocular pressure is overcome and the plunger is again urged toward said protrudent position, and means for measuring the magnitude of said air pressure required to overcome said resistance and indicating the magnitude of said intraocular pressure.

4. A device for measuring the intraocular pressure of an eyeball comprising:

a probe having a wall for engaging the surface of said eyeball, a chamber within said probe, an axially movable plunger carried within said chamber and having one end extending through an aperture in said wall to the exterior, said plunger being movable between protrudent and retracted positions, a source of air under pressure, fluid conduit means coupling said source with the interior of said chamber for introducing said air into said chamber for acting against said plunger to urge said plunger into a said protrudent position with said one end protuding externally from said wall when the probe is out of contact with said eyeball, at least one port in a wall of said chamber other than said first mentioned wall for venting said chamber when said plunger is in said protrudent position for maintaining the pressure of said air, at least within said chamber, at a level inadequate to prevent depression of said plunger into said retracted position when the wall of the probe is urged into contact with said eyeball, valve means carried by said plunger and operable upon said depression of said plunger for isolating said port from said conduit means whereby the air pressure acting upon said plunger is caused to rise continually until the resistance due to said intraocular pressure is overcome and the plunger is again urged toward said protrudent position, and pressure gauging means coupled to said conduit means at a point where the internal pressure corresponds closely with the pressure acting upon said plunger for indicating the magnitude of said intraocular pressure.

5. A device for measuring the intraocular pressure of an eyeball comprising:

a probe having a wall for engaging the surface of said eyeball, a chamber within said probe, an axially movable plunger carried within said chamber and having one end extending through an aperture in said wall to the exterior, said plunger being movable between protrudent and retracted positions, a source of air under pressure at a low supply rate, a fluid conduit means coupling said source with the interior of said chamber for introducing said air into said chamber for acting against said plunger to urge said plunger into said protrudent position with said one end protruding externally from said wall when the probe is out of contact with said eyeball, at least one port in a wall of said chamber other than said first mentioned wall for venting said chamber when said plunger is in said protrudent position for maintaining the pressure of said air, at least within said chamber, at a level inadequate to prevent depression of said plunger into said retracted position when the wall of the probe is urged into contact with said eyeball, valve means carried by said plunger and operable upon said depression of said plunger to a predetermined position for isolating said port from said fluid conduit means whereby the air pressure within said chamber and acting upon said plunger is caused to rise continually until the resistance due to said intraocular pressure is overcome and the plunger is again urged toward said protrudent position, the said one end of said plunger being flush with the exterior surface of said first mentioned wall when said plunger occupies said predetermined position, means for limiting said depression of said plunger at said predetermined position, and pressure gauging means coupled to said conduit means adjacent said chamber for indicating the magnitude of said intraocular pressure.

6. A device for measuring the intraocular pressure of an eyeball comprising:

a probe having a wall for engaging the surface of said eyeball, a chamber within said probe, an axially movable plunger carried within said chamber and having one end extending through an aperture in said wall to the exterior, said plunger being movable between limited protrudent and retracted positions, fluid conduit means communicating with the interior of said chamber, said conduit means including means for coupling it to a source of air under pressure, at least one port in a wall of said chamber other than said first mentioned wall communicating with the exterior, valve means carried by said plunger and operable when said plunger occupies said limited retracted position for isolating said port from said conduit means, the length of said plunger being such that it is depressed into said limited retracted position by contacting the surface of an eyeball with said first mentioned wall of the probe, and means for coupling a pressure gauge to said conduit means at a point adjacent said chamber.

7. A device according to claim 6, wherein said probe is provided on its side opposite said first mentioned wall with a finger embracing clip and arranged to be carried by the tip of a human finger in measuring position.

References Cited by the Examiner

UNITED STATES PATENTS

| | | | |
|---|---|---|---|
| 2,708,928 | 5/1955 | Zenatti | 73—80 |
| 2,882,891 | 4/1959 | Husted | 73—80 X |
| 3,099,262 | 7/1963 | Bigliano | 128—2.05 |

FOREIGN PATENTS 672,148  10/1963  Canada.

RICHARD C. QUEISSER, *Primary Examiner.*

J. FISHER, *Assistant Examiner.*